United States Patent
Jordan

(10) Patent No.: US 7,487,741 B2
(45) Date of Patent: Feb. 10, 2009

(54) PET WATER DISH

(76) Inventor: Terry Jordan, P.O. Box 651, Begota, TX (US) 75417

( * ) Notice: Subject to any disclaimer, the term of this patent is extended or adjusted under 35 U.S.C. 154(b) by 356 days.

(21) Appl. No.: 11/511,900

(22) Filed: Aug. 18, 2006

(65) Prior Publication Data
US 2008/0072831 A1    Mar. 27, 2008

Related U.S. Application Data

(60) Provisional application No. 60/710,001, filed on Aug. 19, 2005.

(51) Int. Cl.
*A01K 1/10* (2006.01)
*A01K 5/00* (2006.01)
*A01K 5/01* (2006.01)
*A01K 39/00* (2006.01)

(52) U.S. Cl. ........................ 119/61.54; 119/61; 119/74; 220/621

(58) Field of Classification Search ............... 119/61.54, 119/61.55, 61.56; 220/501, 503, 504, 507, 220/554, 555, 566; 215/6
See application file for complete search history.

(56) References Cited

U.S. PATENT DOCUMENTS

| | | | | |
|---|---|---|---|---|
| 5,297,504 A | * | 3/1994 | Carrico | 119/61.54 |
| 5,791,287 A | * | 8/1998 | Gruber | 119/74 |
| 5,960,740 A | * | 10/1999 | Pelsor | 119/61.54 |
| 6,032,824 A | * | 3/2000 | Barrow | 220/621 |

* cited by examiner

*Primary Examiner*—Michael R Mansen
*Assistant Examiner*—Valentina Xavier
(74) *Attorney, Agent, or Firm*—Robert C. Klinger

(57) ABSTRACT

A pet water dish designed to retain water when repeatedly overturned. One embodiment of the invention utilizes two annular chambers separated by a flat base, and having an aperture allowing water to flow from one chamber into a reservoir when the respective chamber is upright and also allow water to flow back into the chamber when the bowl is inverted. The pet water dish may be inverted repeatedly, and each time, most or all of the water is retained in the dish. This helps ensure that the pet will always have drinking water available.

20 Claims, 3 Drawing Sheets

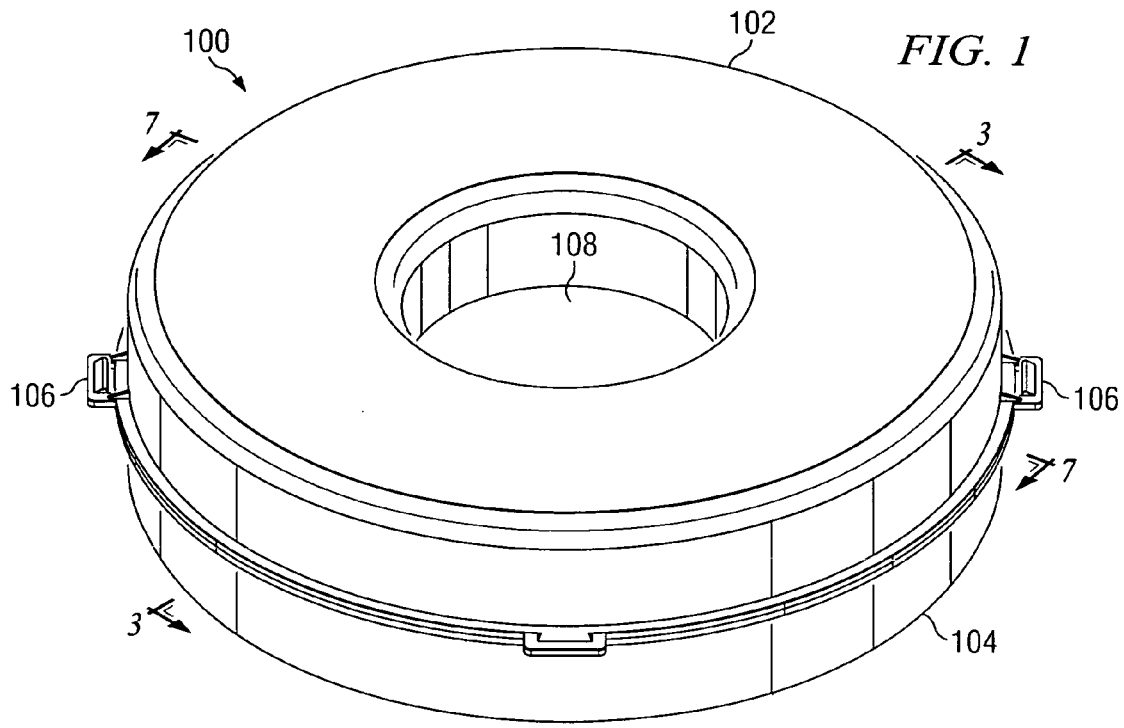
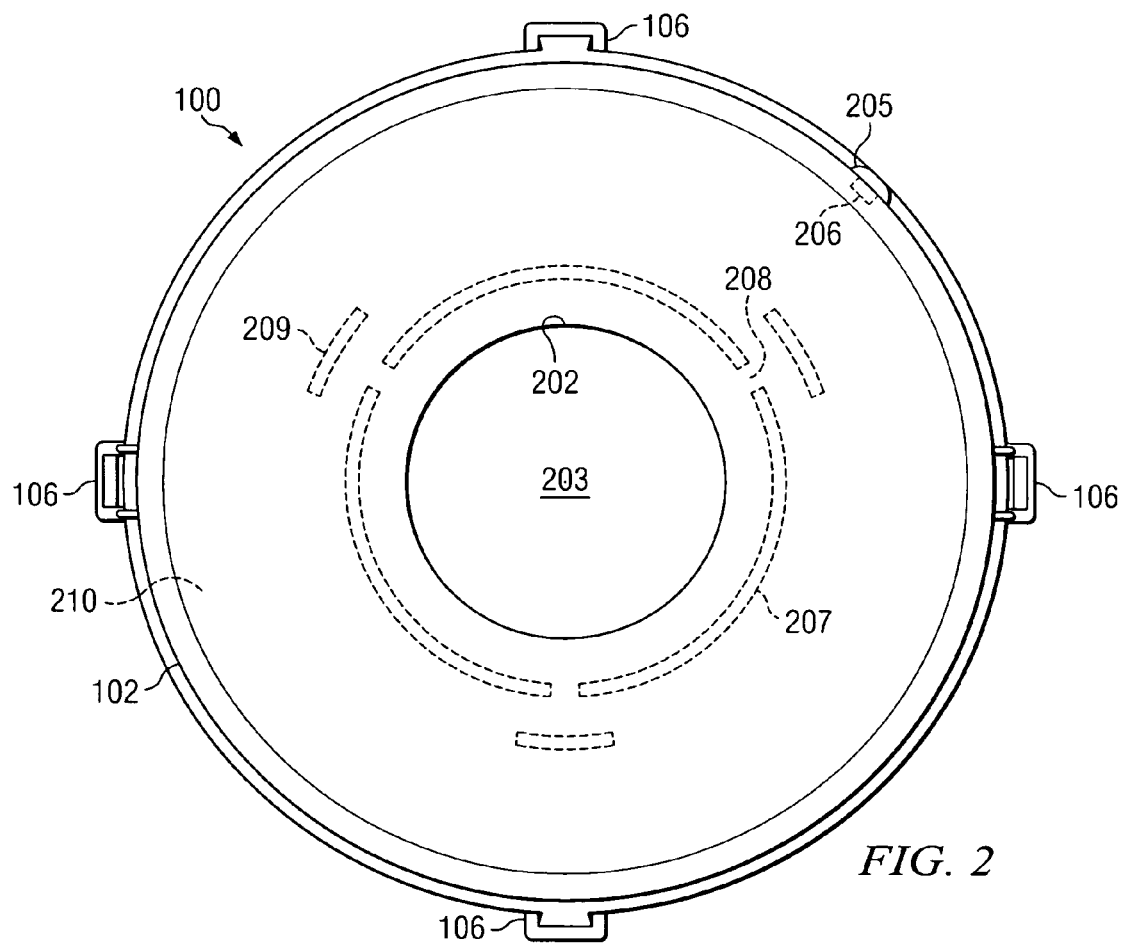

PET WATER DISH

CLAIM OF PRIORITY

This application claims priority of U.S. Provisional Ser. No. 60/710,001 filed Aug. 19, 2005 entitled "Pet Water Dish" the teaching of which are incorporated herein by reference.

FIELD OF THE INVENTION

The present invention relates to animal care, and more particularly to a device for feeding an animal.

BACKGROUND OF THE INVENTION

Many owners of playful pets find themselves faced with the recurring problem of overturned water dishes. Dogs in particular see every object readily available as a play toy, and one of the most readily available things in a dog's environment is his water dish. The dog's owner may find that day after day he fills the water dish in the morning, only to find that it has been overturned long before the end of the day. This problem may appear, at first blush, to be a mere annoyance—after all, it takes only a few moments to fill a water bowl. But a bowl that must be re-filled several times in a day can become a relentless chore unto itself. Even worse, a working owner may fill his dog's dish in the morning only to find, when he returns home late in the afternoon, that the dog has suffered the heat of summer's midday with an empty water bowl.

The owner can hardly expect to reason with the dog whose playful tendencies are the dilemma's root cause, so he usually takes steps to prevent the dog from playing with the dish. Often, this means a dish that is cumbersome and difficult to move, which is inconvenient to the owner and quite disappointing for the dog.

There is a desire for an improved dish that retains water even when aggressively addressed by an animal.

SUMMARY OF INVENTION

The present invention achieves technical advantages as a pet water dish designed to retain water when repeatedly overturned. One embodiment of the invention utilizes two annular chambers separated by a flat base, and having an aperture allowing water to flow from one chamber into a reservoir when the respective chamber is upright and also allow water to flow back into the chamber when the bowl is inverted. The pet water dish may be inverted repeatedly and each time, most or all of the water is retained in the dish. This helps ensure that the pet will always have drinking water available.

BRIEF DESCRIPTION OF THE DRAWINGS

FIG. 1 is a perspective view of a first embodiment of the invention;

FIG. 2 is a cross sectional view taken along lines 2-2 in FIG. 1;

DETAILED DESCRIPTION OF THE PRESENT INVENTION

Figure 3:
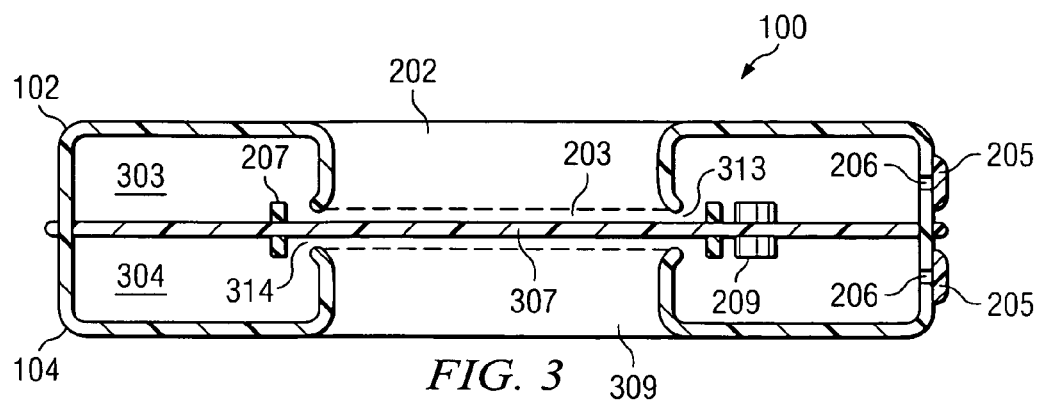
FIG. 3 is a cross-sectional view taken along lines 3-3 in FIG. 2, showing the configuration of shell one, shell two, a splash guard, and drain plugs.

Referring to FIG. 1, there is generally shown a water dish 100 capable of retaining and presenting water even when overturned multiple times. One embodiment of the invention is a vessel with an exterior housing comprised of two components or portions, shell one 102 and shell two 104, which are held together by a plurality of fasteners 106. The shells may be fixed together, or be formed of a unitary body if desired. Shell one 102 and shell two 104 are equipped with male and female gender fastener ends. At the center of both sides of the housing is a circular aperture 108 where the fluid is held and presented to the pet when in the upright position.

Referring now to FIG. 2, there is generally shown a cross sectional view taken along lines 2-2 in FIG. 1. The shell one housing 102 has an upwardly facing aperture 202 through which the water can be accessed by the pet for drinking. A drain plug 205 creates a water-tight seal in a drain hole 206 which allows for emptying or filling of the fluid contained within the respective shell. Shell one and shell two are disposed together by multiple fasteners 106 which assist in keeping a water-tight seal between the shells. A splash guard 207 formed as an inner annular wall of the respective shell includes three small openings 208 having equidistant spacing. The arcuate elongated splash guard circumscribe the circular aperture 202 proximate a respective opening and have a slightly larger radius. The openings 208 in the splash guard 207 allow fluid communication between a reservoir 210 disposed behind the splash guard and a drinking reservoir 203 created by the splash guard which is accessible through the aperture 202. A secondary row of arcuate splash guards 209 are disposed behind the openings 208 to prevent the fluid from surging in and out of the openings 208 causing the fluid to splash out of the housing.

Referring to FIG. 3, there is shown a cross-sectional view taken along line 3-3 in FIG. 1, with the dish 100 formed by coupling shell one 102 to shell two 104. A dish floor component 307 bisects the housing along the seam created by disposing shell one 102 to shell two 104. The dish floor component 307 has the inner splash guard 207 and the outer splash guard 209 on the top side proximate the top side breach 313 which circumscribes the top side aperture 202, with the inner splash guard 207 and the outer splash guard 209 on the bottom side proximate the bottom side breach 314 which circumscribes the bottom aperture 309. When filled, the fluid is stored in the top annular chamber 303 and the bottom annular chamber 304, as well as the drinking reservoir 203 from which the pet may drink. The inner splash guard 207 and the outer splash guard 209 contain the fluid to either the top annular chamber 303 or the drinking reservoir 203. Openings 206 allow the fluid contained within the top annular chamber reservoir 303, and the bottom annular chamber reservoir 304 to be emptied. When emptying of the chambers is not desirable, a plug 205 can be inserted to create a water-tight seal in the openings.

When the top annular chamber reservoir 303 is above the bottom annular chamber reservoir 304, fluid within the top annular chamber reservoir 303 rests across the drinking reservoir 203 with fluid also resting in the curvature of the bottom annular chamber reservoir 304. If the invention is later inverted, the inner splash guard 207 and the outer splash guard 209 on the top side channel the flow of the water from the drinking reservoir 315 into the top annular chamber reservoir 303 and prevent it from splashing out into the drinking reservoir 203. Simultaneously, inner splash guard 207 and the outer splash guard 209 on the bottom side help keep the fluid in the bottom annular chamber reservoir 304 until the invention is again inverted. When inverted, the fluid will controllably flow from the bottom annular chamber reservoir 304 into the drinking reservoir 203 via the top side breach 313, where it will be available for drinking. Each time the invention is overturned in this manner, a trivial amount of fluid may be lost from each side, but most of the fluid will be contained in the reservoirs, minimizing the amount of fluid lost.

Figure 4:
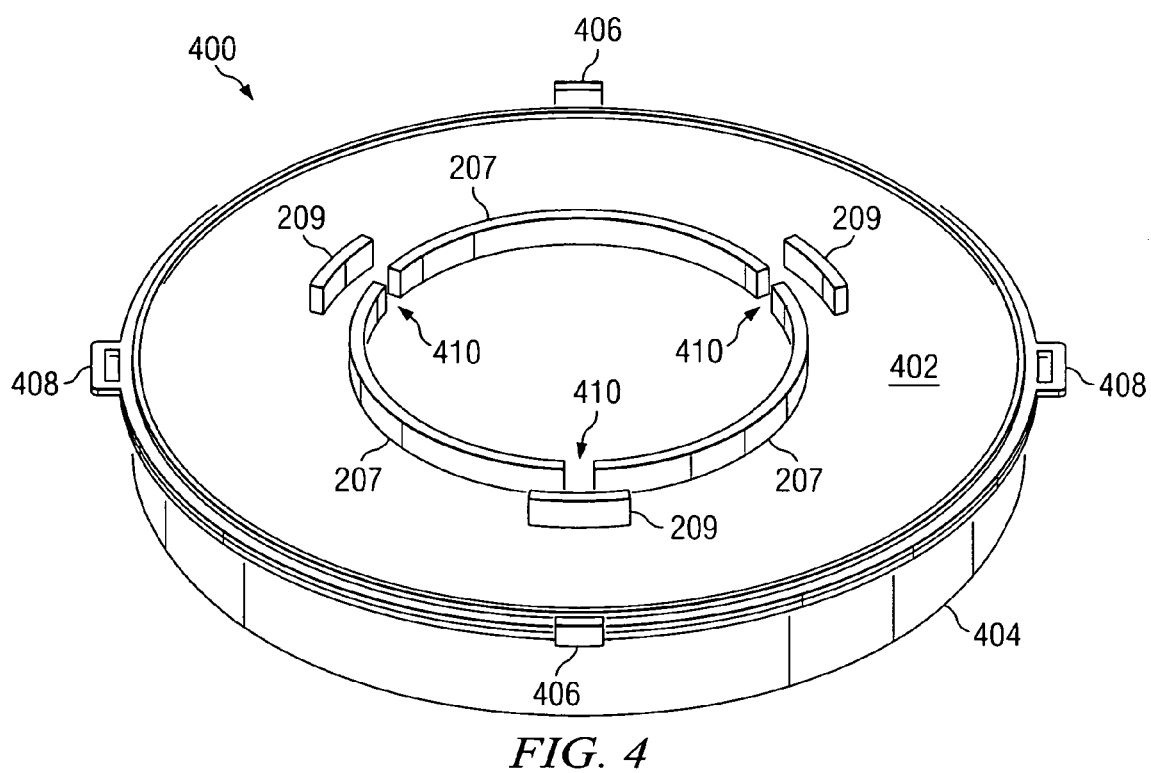
FIG. 4 is a perspective view of the first embodiment of the invention with shell one removed, showing the splash guard in greater detail.

Referring now to FIG. 4, there is shown a perspective view 400 of the first embodiment of the invention with shell one removed which allows a closer inspection of the splash guard configuration as it is oriented in shell two 404. Shell two is configured with both a male 406 fastener end and a female 408 fastener end. The circular dish floor component 307 is disposed atop shell two 404. The splash guard 207 with three arcuate components is disposed on the dish floor component 402 help to mitigate fluid loss. The openings 410 between the splash guard components 207 are followed by a second splash guard 209 with three arcuate components which regulate direct water flow.

Figure 5:
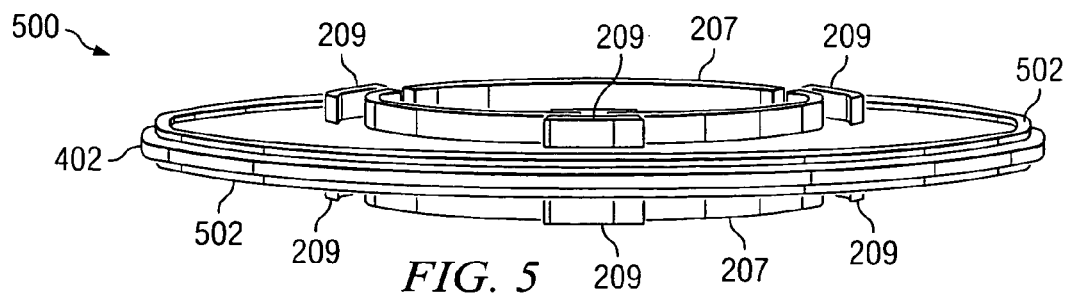
FIG. 5 is a perspective side view of a circular dish floor component.

Referring now to FIG. 5, there is generally shown at 500 a perspective side view of the circular dish floor component without the housing. An inner splash guard row 207 and an outer splash guard row 209 are disposed on both sides of a dish floor component 402. Circumscribing the outer edge of both sides of the dish floor component 402, is a raised edge 502 for keeping the seal between shell one and shell two water tight.

Figure 6:
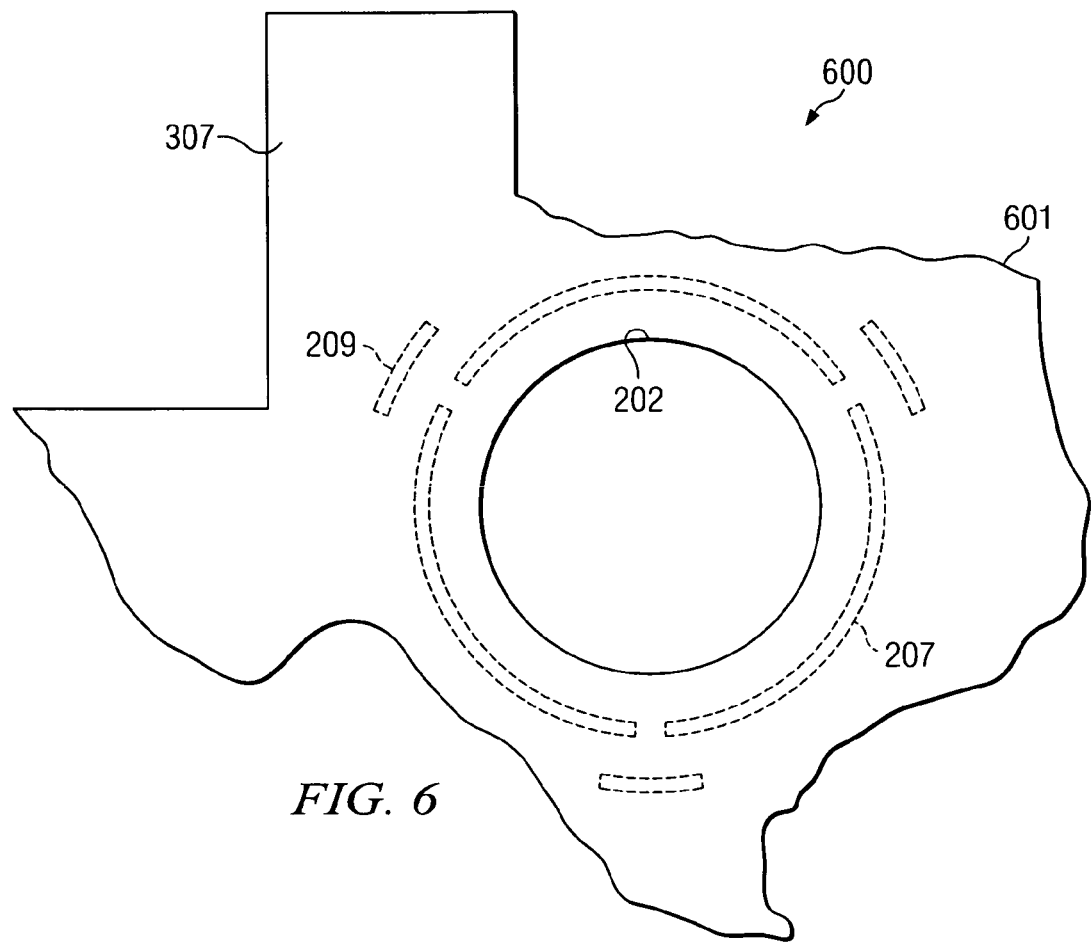
FIG. 6 is a top view of a second embodiment of the invention, wherein the housing is configured in a popular shape.

Referring now to FIG. 6, there is shown a top view of a second embodiment of the invention 600, wherein the housing is configured in a popular shape 601. Although the outline of the dish floor component 307 changes, the internal configuration does not change with two concentric splash guard rows 207,209 surrounding a top aperture 202.

Figure 7:
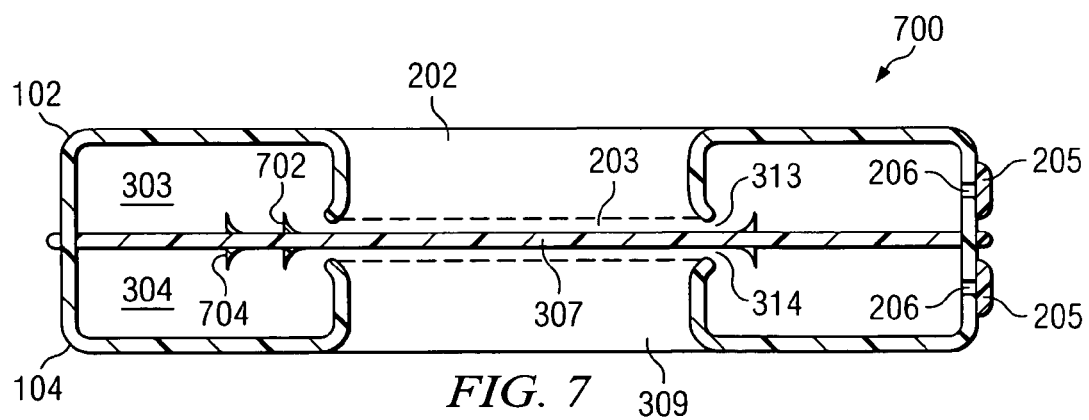
FIG. 7 is a cross-sectional view of a third embodiment of the invention with arcuate splash guards.

Referring to FIG. 7, there is shown a cross-sectional view 700 of a third embodiment of the invention having arcuate splash guards with a housing formed by disposing shell one 102 to shell two 104. In the third embodiment, the dish floor component 307 has the arcuate inner splash guard 702 and the arcuate outer splash guard 704 on the top side proximate the top side breach 313 which circumscribes the top side aperture 202, with the arcuate inner splash guard 702 and the arcuate outer splash guard 703 on the bottom side proximate the bottom side breach 314 which circumscribes the bottom aperture 309. The arcuate splash guards contribute to greater regulation of the fluid communication between chambers.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

What is claimed is:

1. A vessel for holding and presenting a liquid comprising:
a first and second generally annular chamber;
a base member disposed between the chambers and defining a first and second recess proximate the first chamber and second chamber, respectively; and
at least one first opening fluidly communicating the first chamber to the first recess, and at least one second opening fluidly communicating the second chamber to the second recess.

2. The vessel as specified in claim 1 further comprising a first splash guard disposed in the interior of the first chamber and configured to regulate a rate of fluid flow between the first chamber and the first recess.

3. The vessel as specified in claim 2 wherein the first splash guard is disposed proximate the first opening.

4. The vessel as specified in claim 2 further comprising a second splash guard disposed in the interior of the second chamber and configured to regulate a rate of fluid flow between the second chamber and the second recess.

5. The vessel as specified in claim 4 wherein the second splash guard is disposed proximate the second opening.

6. The vessel as specified in claim 1 further comprising a plurality of the first openings.

7. The vessel as specified in claim 6 wherein the plurality of first openings are spaced about the first recess.

8. The vessel as specified in claim 6 further comprising a plurality of the second openings.

9. The vessel as specified in claim 8 wherein the plurality of second openings are spaced about the second recess.

10. The vessel as specified in claim 2 wherein the first splash guard has a curved surface.

11. The vessel as specified in claim 10 wherein the curved surface faces the first opening.

12. The vessel as specified in claim 1 further comprising a first port communicating the first chamber to the ambient.

13. The vessel as specified in claim 12 further comprising a second port communicating the second chamber to the ambient.

14. The vessel as specified in claim 13 wherein the first and second ports are configured to be selectively open and closed.

15. The vessel as specified in claim 14 further comprising a plug disposed in the first port.

16. The vessel as specified in claim 1 wherein the base member further forms a common wall between the first chamber and the second chamber.

17. The vessel as specified in claim 16 wherein the first chamber and the second chamber are fluidly isolated from one another.

18. The vessel as specified in claim 1 wherein the chambers are generally circular.

19. The vessel as specified in claim 1 wherein the first chamber has an inner wall facing the first recess, which inner wall extends inwardly proximate the base member.

20. The vessel as specified in claim 1 wherein the first and second chambers are selectively separable from each other, and also selectively securable to each other.

* * * * *